(12) United States Patent
Weiss et al.

(10) Patent No.: US 8,725,578 B2
(45) Date of Patent: May 13, 2014

(54) METHOD AND APPARATUS FOR AUTHORIZING A FINANCIAL TRANSACTION

(75) Inventors: Benjamin R. Weiss, Portola Valley, CA (US); Jim Del Favero, Redwood City, CA (US); Todd M. Fitch, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 1174 days.

(21) Appl. No.: 12/022,832

(22) Filed: Jan. 30, 2008

(65) Prior Publication Data

US 2009/0192903 A1   Jul. 30, 2009

(51) Int. Cl.
*G06Q 20/00* (2012.01)

(52) U.S. Cl.
USPC ............................................. 705/18; 705/16

(58) Field of Classification Search
None
See application file for complete search history.

(56) References Cited

U.S. PATENT DOCUMENTS

| | | | |
|---|---|---|---|
| 7,376,431 B2 * | 5/2008 | Niedermeyer | 455/456.3 |
| 7,500,607 B2 * | 3/2009 | Williams | 235/380 |
| 7,594,605 B2 * | 9/2009 | Aaron et al. | 235/380 |
| 7,640,590 B1 * | 12/2009 | McCorkendale et al. | 726/25 |
| 7,890,743 B2 * | 2/2011 | Buchanan et al. | 713/1 |
| 2004/0078340 A1 * | 4/2004 | Evans | 705/64 |
| 2007/0084913 A1 * | 4/2007 | Weston | 235/380 |
| 2012/0173429 A1 * | 7/2012 | Stevens | 705/44 |

* cited by examiner

*Primary Examiner* — Ryan Zeender
*Assistant Examiner* — Allen Chein
(74) *Attorney, Agent, or Firm* — Park, Vaughan, Fleming & Dowler LLP

(57) ABSTRACT

A system that authorizes a financial transaction is presented. During operation, the system receives a request to authorize accounts associated with one or more financial instruments to be used to fulfill the financial transaction. Next, the system determines a transaction location at which the financial transaction is being performed. The system then determines whether the accounts are authorized to be used at the transaction location. If so, the system authorizes the accounts to be used to fulfill the financial transaction.

3 Claims, 8 Drawing Sheets

METHOD AND APPARATUS FOR AUTHORIZING A FINANCIAL TRANSACTION

BACKGROUND

Related Art

The present invention relates to techniques for authorizing a financial transaction.

In response to the increased prevalence of credit card fraud, credit card issuers and processors have implemented security measures to attempt to reduce the possibility of credit card fraud. For example, some credit card processors request the billing zip code so that the credit card processor can validate a transaction. Some credit card processors also use a credit card validation (CCV) code printed on the credit card to validate that a credit card is present when completing a transaction. Unfortunately, a malicious user can often obtain the billing zip code and the CCV code associated with the credit card thereby circumventing these security measures. These problems are compounded by the fact that a typical credit card user does not become aware of credit card fraud until the user receives the monthly credit card bill, which can be weeks after the fraudulent transaction takes place.

SUMMARY

Some embodiments of the present invention provide a system that authorizes a financial transaction. During operation, the system receives a request to authorize accounts associated with one or more financial instruments to be used to fulfill the financial transaction. Next, the system determines a transaction location at which the financial transaction is being performed. The system then determines whether the accounts are authorized to be used at the transaction location. If so, the system authorizes the accounts to be used to fulfill the financial transaction.

In some embodiments, while determining whether the accounts are authorized to be used at the transaction location, the system determines a present location of a user associated with the accounts being used to fulfill the financial transaction. The system then determines whether the present location of the user is within a specified distance of the transaction location. If so, the system determines that the accounts are authorized to be used at the transaction location. Otherwise, the system determines that the accounts are not authorized to be used at the transaction location.

In some embodiments, while determining the present location of the user associated with the accounts, the system uses a device which includes a global-positioning system which determines the present location of the user.

In some embodiments, the device includes one or more of: a mobile phone; a personal digital assistant (PDA); a navigation system; and the one or more financial instruments.

In some embodiments, if the financial transaction is being performed at a physical storefront for a merchant, while determining the transaction location, the system determines a location of the physical storefront.

In some embodiments, while determining the location of the physical storefront, the system retrieves the location of the physical storefront from a database.

In some embodiments, while determining the location of the physical storefront, the system receives the location of the physical storefront from a point-of-sale device being used to request authorization to use the accounts to fulfill the financial transaction.

In some embodiments, the point-of-sale device includes a global-positioning system which determines the location of the physical storefront.

In some embodiments, if the financial transaction is being performed at an online storefront for a merchant, while determining the transaction location, the system determines an Internet Protocol (IP) address from which the request to authorize the accounts associated with one or more financial instruments to be used to fulfill the financial transaction is made. The system then determines a geographic area in which the IP address has been allocated.

In some embodiments, if accounts are not authorized to be used at the transaction location, the system performs a remedial action.

In some embodiments, the remedial action can include performing one or more of: denying the request to authorize accounts associated with one or more financial instruments to be used to fulfill the financial transaction; and requesting manual verification that the accounts are valid.

In some embodiments, while determining whether the accounts are authorized to be used at the transaction location, the system determines that the accounts are restricted to being used within a specified geographic area. The system then determines whether the transaction location is located within the specified geographic area. If so, the system determines that the accounts are authorized to be used at the transaction location. Otherwise, the system determines that the accounts are not authorized to be used at the transaction location.

In some embodiments, while determining whether the accounts are authorized to be used at the transaction location, the system determines that the accounts are restricted to being used outside of a specified geographic area. The system then determines whether the transaction location is located outside of the specified geographic area. If the system determines that the transaction location is located outside of the specified geographic area, the system determines that the accounts are authorized to be used at the transaction location. Otherwise, the system determines that the accounts are not authorized to be used at the transaction location.

In some embodiments, while determining whether the accounts are authorized to be used at the transaction location, the system determines that the accounts are restricted to being used when two or more users associated with the accounts are within a specified distance of each other. Next, the system determines present locations for the two or more users. The system then determines whether the present locations for the two or more users are within the specified distance of each other and within a specified distance of the transaction location. If so, the system determines that the accounts are authorized to be used at the transaction location. Otherwise, the system determines that the accounts are not authorized to be used at the transaction location.

In some embodiments, the one or more financial instruments include one or more of: a debit card; a credit card; a charge card; and a bank account.

In some embodiments, the financial transaction involves one or more of: purchasing of goods; purchasing of services; cash advances; and cash advances in a foreign currency.

Some embodiments of the present invention provide a point-of-sale device which includes: an input module; a location-determination module; a communication module; and a transaction-fulfillment module. The input module is configured to receive parameters for accounts associated with one or more financial instruments to be used to fulfill a financial transaction. The location-determination module is configured to determine a location of the point-of-sale device. The communication module is configured to send a request to an authorization service to approve the accounts to be used to fulfill the financial transaction at the location of the point-of-sale device. If the authorization service approves the request, the transaction-fulfillment module is configured to: receive a notification that the accounts have been authorized; and fulfill the financial transaction using the accounts.

Some embodiments of the present invention provide a location-based authentication service which includes: a receiving module; and an authorization module. The receiving module is configured to receive a request to authorize accounts associated with one or more financial instruments to be used to fulfill a financial transaction at a transaction location. The authorization module is configured to determine whether the accounts are authorized to be used to fulfill the financial transaction at the transaction location. If the authorization module determines that the accounts are authorized to be used to fulfill the financial transaction at the transaction location, the authorization module is configured to authorize the accounts to be used to fulfill the financial transaction.

Some embodiments of the present invention provide a clearinghouse which includes: a receiving module; and a communication module. In these embodiments, the receiving module is configured to receive parameters for a financial transaction from a point-of-sale device, and the communication module is configured to send the parameters for the financial transaction to an authentication service which determines whether accounts associated with one or more financial instruments can be used to fulfill the financial transaction at a transaction location.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code, data structures, and/or data, which can be stored on a computer-readable storage medium as described above. When a computer system reads and executes the code and/or data stored on the computer-readable storage medium, the computer system performs the methods and processes embodied as code, data structures, and/or data that are stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1A:
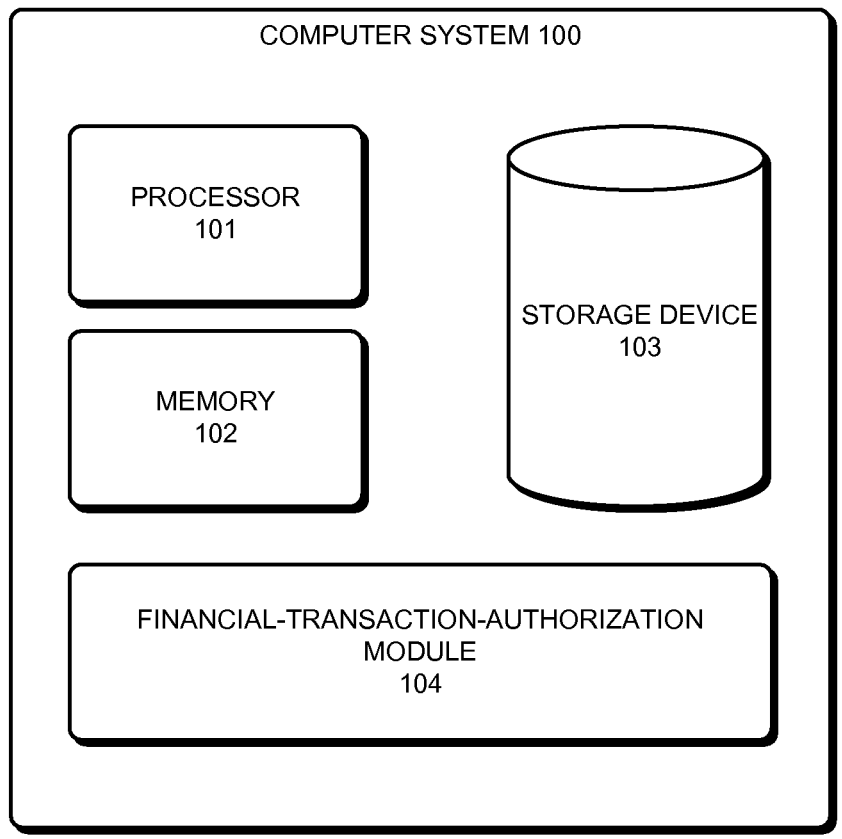
FIG. 1A presents a block diagram of a computer system in accordance with an embodiment of the present invention.

FIG. 1A presents a block diagram illustrating a computer system 100 in accordance with an embodiment of the present invention. Computer system 100 includes processor 101, memory 102, storage device 103, and financial-transaction-authorization module 104.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory.

In some embodiments of the present invention, financial-transaction-authorization module 104 is separate from computer system 100. Note that financial-transaction-authorization module 104 is described in more detail below with reference to FIG. 1B.

Figure 1B:
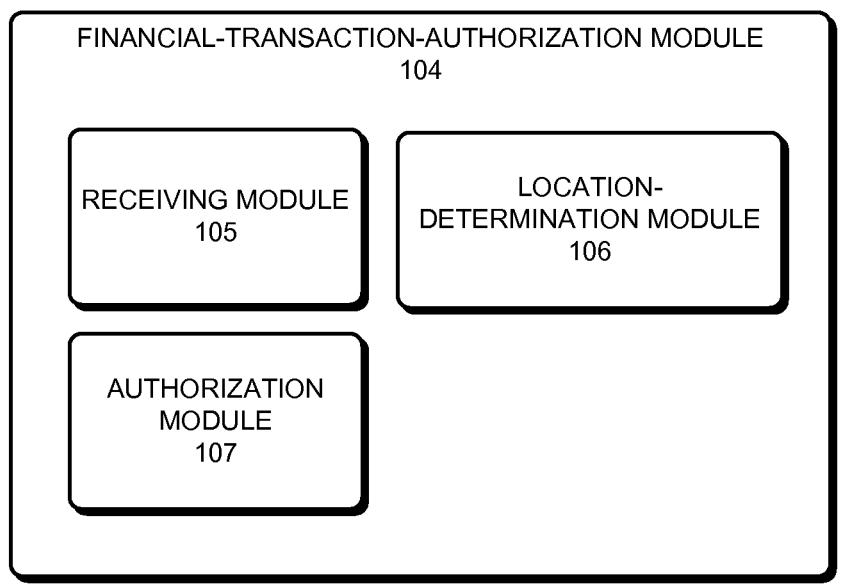
FIG. 1B presents a block diagram of a financial-transaction-authorization module in accordance with an embodiment of the present invention.

FIG. 1B presents a block diagram of financial-transaction-authorization module 104 in accordance with an embodiment of the present invention. Financial-transaction-authorization module 104 includes one or more of: receiving module 105; location-determination module 106; and authorization module 107. Receiving module 105 is configured to receive a request to authorize accounts associated with one or more financial instruments to be used to fulfill the financial transaction. Location-determination module 106 is configured to determine a transaction location at which the financial transaction is being performed. Authorization module 107 is configured to determine whether the accounts are authorized to be used at the transaction location. If authorization module 107 determines that the accounts are authorized to be used at the transaction location, authorization module 107 is configured to authorize the accounts to be used to fulfill the financial transaction.

In some embodiments, one or more of receiving module 105, location-determination module 106, and authorization module 107 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.

Location-Based Authentication of Financial Transactions

Figure 2:
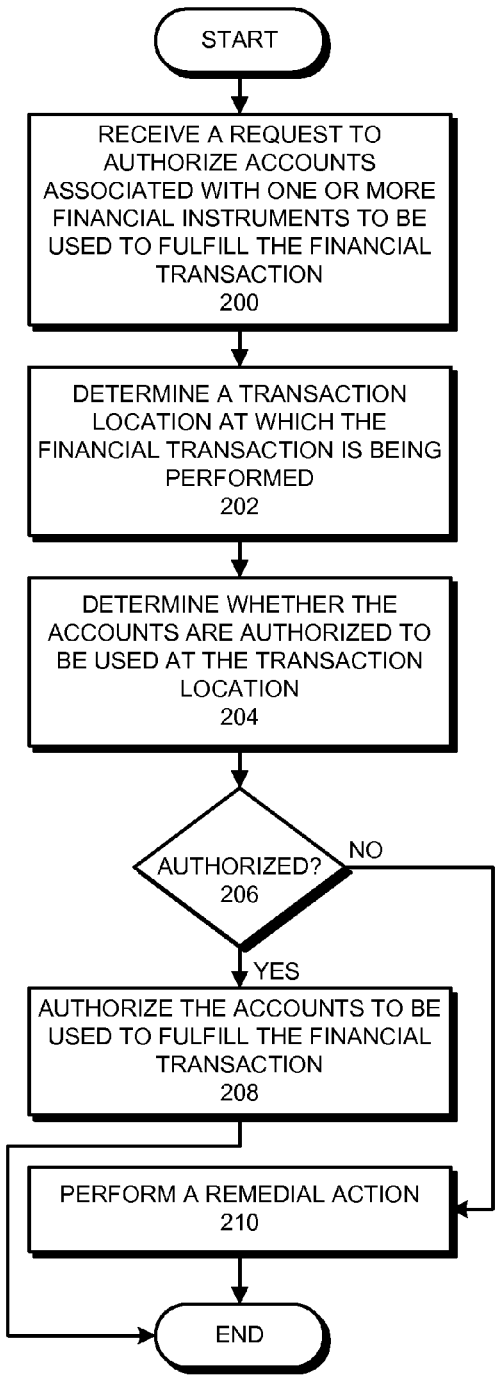
FIG. 2 presents a flow chart illustrating the process for authorizing a financial transaction in accordance with an embodiment of the present invention.

FIG. 2 presents a flow chart illustrating the process of authorizing a financial transaction in accordance with an embodiment of the present invention. The process begins when the system receives a request to authorize accounts associated with one or more financial instruments to be used to fulfill the financial transaction (step 200). Next, the system determines a transaction location at which the financial transaction is being performed (step 202). The system then determines whether the accounts are authorized to be used at the transaction location (step 204). If so (step 206, yes), the system authorizes the accounts to be used to fulfill the financial transaction (step 208). Otherwise (step 206, no), the system performs a remedial action (step 210). In some embodiments, the remedial action can include performing one or more of: denying the request to authorize accounts associated with one or more financial instruments to be used to fulfill the financial transaction; and requesting manual verification that the accounts can be used to fulfill the financial transaction.

In some embodiments, the one or more financial instruments include one or more of: a debit card; a credit card; a charge card; a bank account; and any financial instrument now known or later developed.

In some embodiments, the financial transaction involves one or more of: purchasing of goods; purchasing of services; cash advances; and cash advances in a foreign currency.

Figure 3:
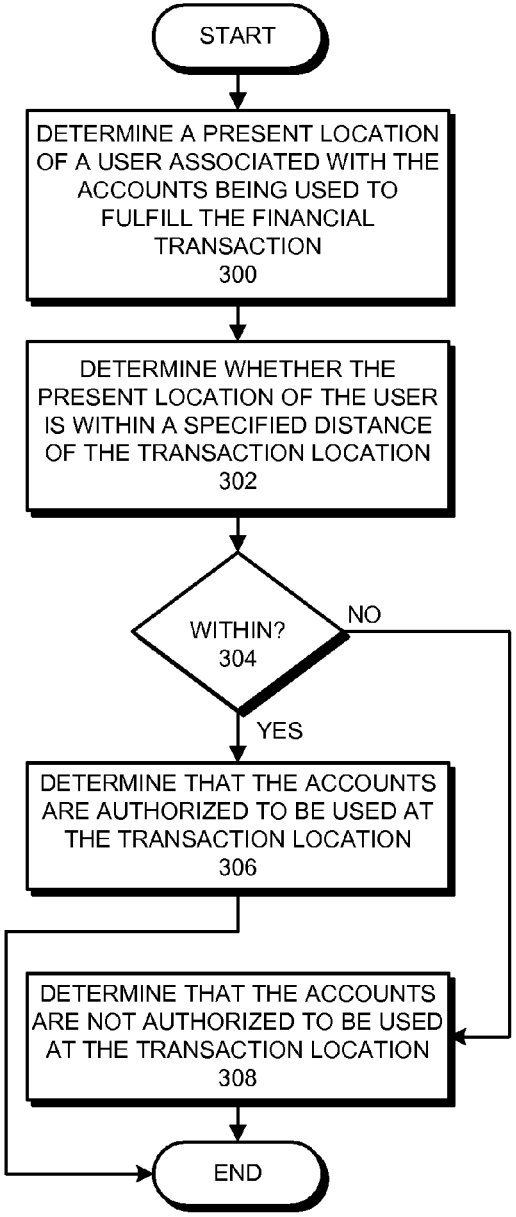
FIG. 3 presents a flow chart illustrating the process for determining whether accounts are authorized to be used at a transaction location in accordance with an embodiment of the present invention.

FIG. 3 presents a flow chart illustrating the process of determining whether accounts are authorized to be used at a transaction location in accordance with an embodiment of the present invention. The process begins when the system determines a present location of a user associated with the accounts being used to fulfill the financial transaction (step 300). In some embodiments, while determining the present location of the user associated with the accounts, the system uses a device which includes a global-positioning system which determines the present location of the user. In some embodiments, the device includes one or more of: a mobile phone; a personal digital assistant (PDA); a navigation system; and the one or more financial instruments. In some embodiments, the user associated with the accounts registers the device with one or more of: a clearinghouse; an authentication service; a credit card processor; and a credit card issuer.

The system then determines whether the present location of the user is within a specified distance of the transaction location (step 302). If so (step 304, yes), the system determines that the accounts are authorized to be used at the transaction location (step 306). Otherwise (step 304, no), the system determines that the accounts are not authorized to be used at the transaction location (step 308).

In some embodiments, if the financial transaction is being performed at a physical storefront for a merchant, while determining the transaction location, the system determines a location of the physical storefront. In some embodiments, while determining the location of the physical storefront, the system retrieves the location of the physical storefront from a database.

In some embodiments, while determining the location of the physical storefront, the system receives the location of the physical storefront from a point-of-sale device being used to request authorization to use the accounts to fulfill the financial transaction. In some embodiments, the point-of-sale device includes a global-positioning system which determines the location of the physical storefront. Note that a point-of-sale device is described in more detail with reference to FIG. 8 below.

Figure 4:
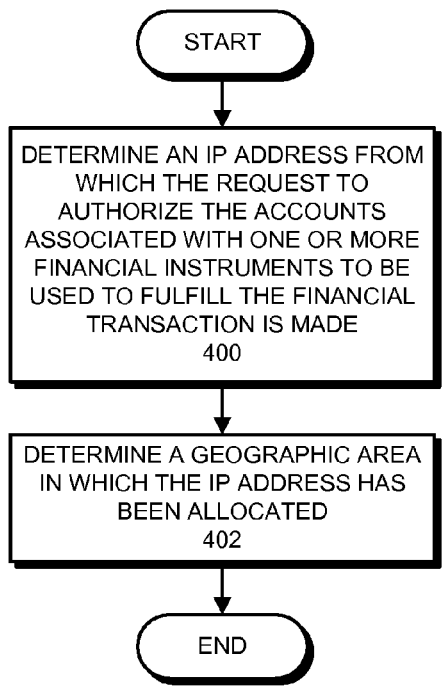
FIG. 4 presents a flow chart illustrating the process for determining the transaction location for an online merchant in accordance with an embodiment of the present invention.

In some embodiments, the financial transaction is performed at an online storefront for a merchant. FIG. 4 presents a flow chart illustrating the process of determining the transaction location for an online merchant in accordance with an embodiment of the present invention. The process begins when the system determines an Internet Protocol (IP) address from which the request to authorize the accounts associated with one or more financial instruments to be used to fulfill the financial transaction is made (step 400). In some embodiments, the IP address is an IP address of a computer system used to interact with an online storefront for the online merchant. In other embodiments, the IP address is the IP address of a server which hosts the online storefront for the online merchant. The system then determines a geographic area in which the IP address has been allocated (step 402).

Figure 5:
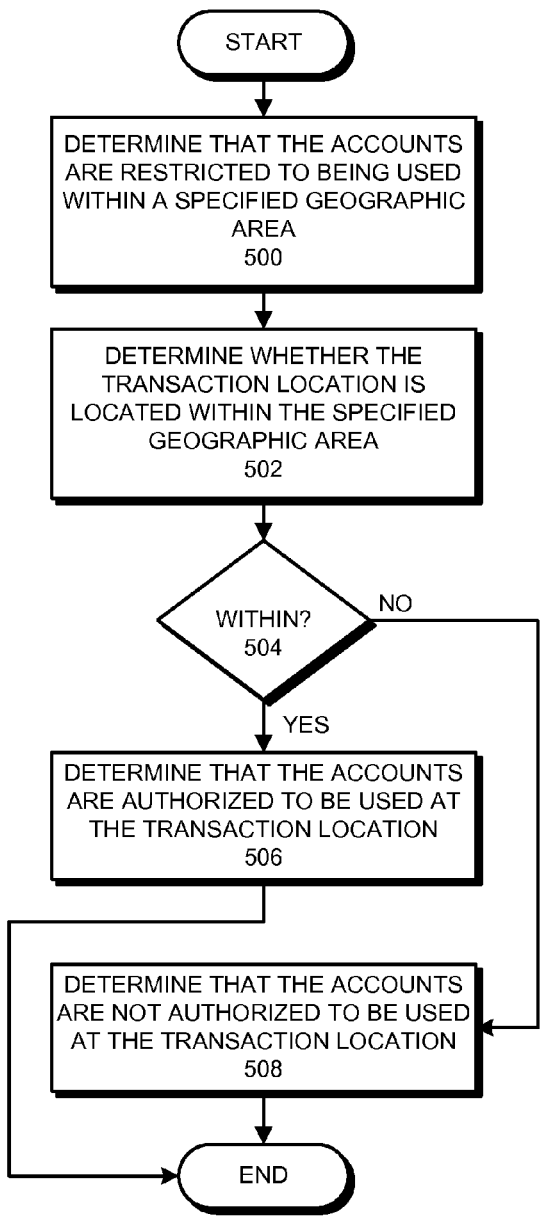
FIG. 5 presents a flow chart illustrating another process for determining whether accounts are authorized to be used at the transaction location in accordance with an embodiment of the present invention.

FIG. 5 presents a flow chart illustrating another process of determining whether accounts are authorized to be used at the transaction location in accordance with an embodiment of the present invention. The process begins when the system determines that the accounts are restricted to being used within a specified geographic area (step 500). The system then determines whether the transaction location is located within the specified geographic area (step 502). If so (step 504, yes), the system determines that the accounts are authorized to be used at the transaction location (step 506). Otherwise (step 504, no), the system determines that the accounts are not authorized to be used at the transaction location (step 508). For example, the use of a credit card can be restricted to a specified distance from a specific location. A parent may want to give a child a credit card that can only be used within a certain radius of home and/or school.

Figure 6:
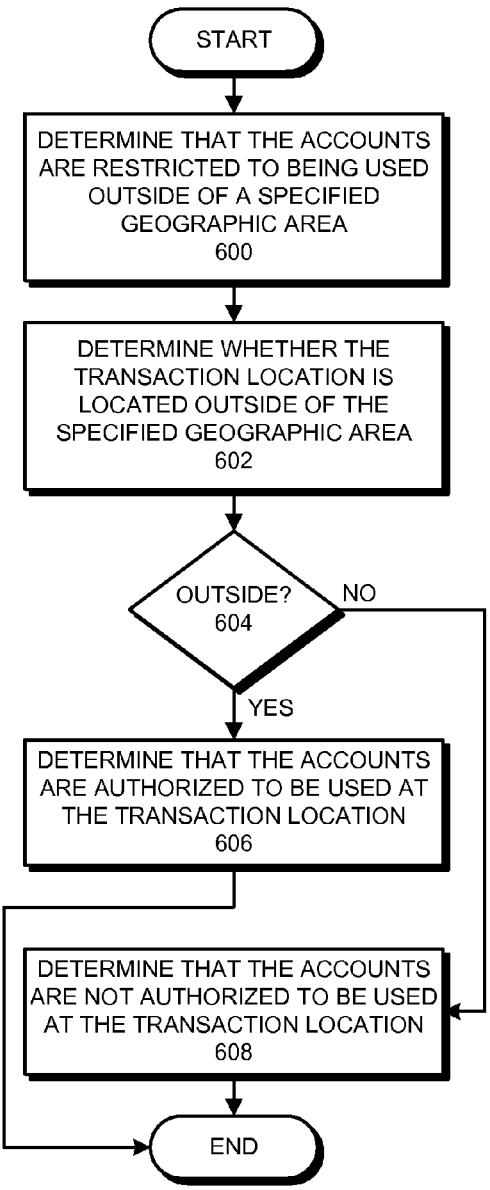
FIG. 6 presents a flow chart illustrating another process for determining whether accounts are authorized to be used at the transaction location in accordance with an embodiment of the present invention.

FIG. 6 presents a flow chart illustrating another process of determining whether accounts are authorized to be used at the transaction location in accordance with an embodiment of the present invention. The process begins when the system determines that the accounts are restricted to being used outside of a specified geographic area (step 600). The system then determines whether the transaction location is located outside of the specified geographic area (step 602). If the system determines that the transaction location is outside of the specified geographic area (step 604, yes), the system determines that the accounts are authorized to be used at the transaction location (step 606). If the system determines that the transaction location is within the specified geographic area (step 604, no), the system determines that the accounts are not authorized to be used at the transaction location (step 610). For example, a parent may want to restrict the use of the credit card so that the credit card cannot be used within twenty miles of home. In this case, the child can use the credit card when the child is farther away than twenty miles from home.

Figure 7:
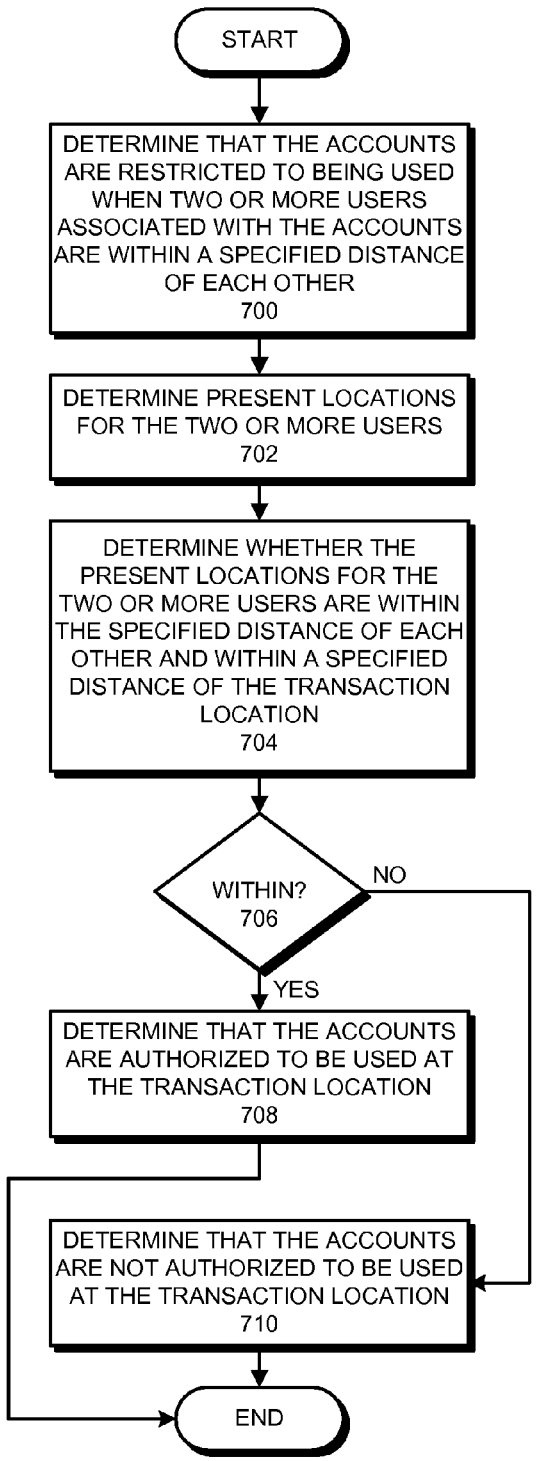
FIG. 7 presents a flow chart illustrating another process for determining whether accounts are authorized to be used at the transaction location in accordance with an embodiment of the present invention.

FIG. 7 presents a flow chart illustrating another process of determining whether accounts are authorized to be used at the transaction location in accordance with an embodiment of the present invention. The process begins when the system determines that the accounts are restricted to being used when two or more users associated with the accounts are within a specified distance of each other (step 700). Next, the system determines present locations for the two or more users (step 702). The system then determines whether the present locations for the two or more users are within the specified distance of each other and within a specified distance of the transaction location (step 704). If so (step 706, yes), the system determines that the accounts are authorized to be used at the transaction location (step 708). Otherwise (step 706, no), the system determines that the accounts are not authorized to be used at the transaction location (step 710). For example, a husband and a wife are both required to be within 20 feet of a point-of-sale device in order for the purchase to be approved.

In some embodiments, spending limits can be based on a user's present location. For example, a user can restrict a credit card so that the user can only spend up to $10 within 20 miles of home, but can spend up to $50 outside of the 20-mile radius.

In some embodiments, a user can control the authentication mechanism used. For example, the user can specify that the authentication process for a specified credit card requires the user to be within 10 feet of the point-of-sale device.

Point-of-Sale Device

Figure 8:
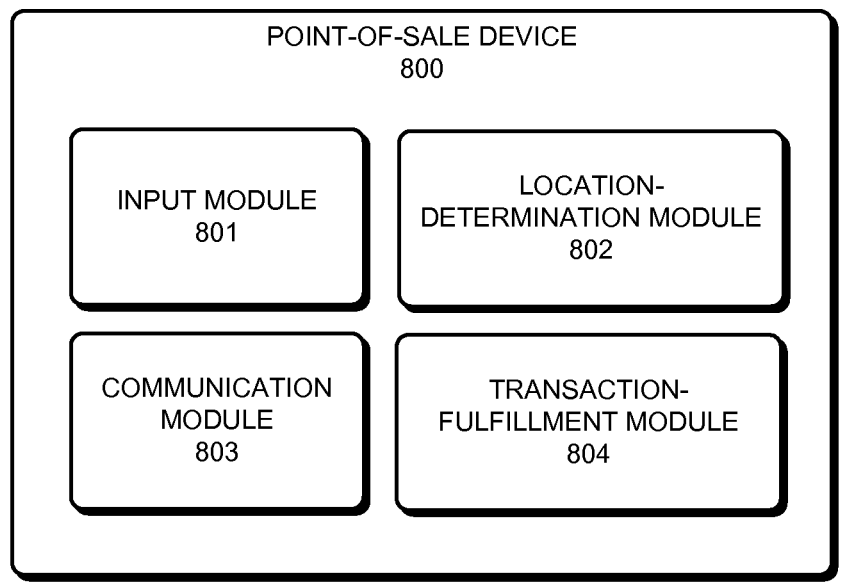
FIG. 8 presents a block diagram of a point-of-sale device in accordance with an embodiment of the present invention.

FIG. 8 presents a block diagram of point-of-sale device 800 in accordance with an embodiment of the present invention. Point-of-sale device 800 includes one or more of: input module 801; location-determination module 802; communication module 803; and transaction-fulfillment module 804. Input module 801 is configured to receive parameters for accounts associated with one or more financial instruments to be used to fulfill a financial transaction. Location-determination module 802 is configured to determine a location of the point-of-sale device. Communication module 803 is configured to send a request to an authorization service to approve the accounts to be used to fulfill the financial transaction at the location of the point-of-sale device. If the authorization service approves the request, transaction-fulfillment module 804 is configured to: receive a notification that the accounts have been authorized; and fulfill the financial transaction using the accounts.

In some embodiments, if the authorization service denies the request, transaction-fulfillment module 804 is configured to: receive a notification that the accounts have not been authorized; and not fulfill the financial transaction using the accounts.

In some embodiments, the authorization service includes one or more of: a location-based authentication service; and a clearinghouse. Note that a location-based authentication service is described in more detail with reference to FIG. 10 below and a clearinghouse is described in more detail with reference to FIG. 9 below.

In some embodiments, point-of-sale device 800 can include: a point-of-sale device located within a physical storefront for a merchant; and a point-of-sale module (e.g., as a hardware module and/or code embedded in a computer-readable storage medium) located at a server hosting an online storefront for the merchant.

In some embodiments, the parameters for a given account include one or more of: an account number; an expiration date; a name of one or more users associated with the given account; and a financial institution that issued the given account.

In some embodiments, location-determination module 802 includes a global-positioning system.

In some embodiments, one or more of input module 801, location-determination module 802, communication module 803, and transaction-fulfillment module 804 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.

Clearinghouse

Figure 9:
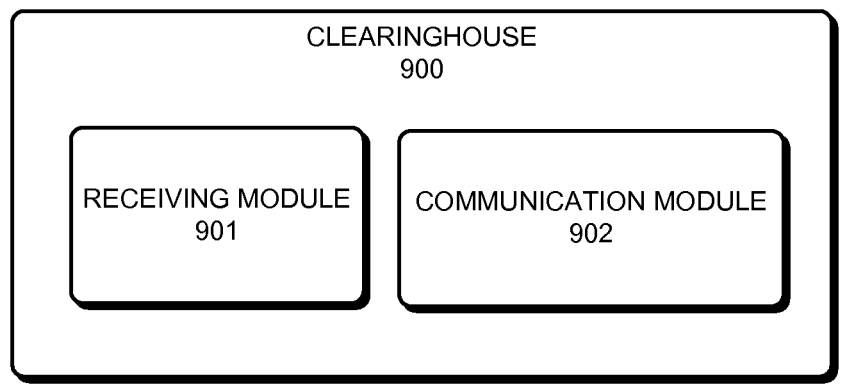
FIG. 9 presents a block diagram of a clearinghouse in accordance with an embodiment of the present invention.

FIG. 9 presents a block diagram of clearinghouse 900 in accordance with an embodiment of the present invention. Clearinghouse 900 includes one or more of: receiving module 901; and communication module 902. Receiving module 901 is configured to receive parameters for a financial transaction from a point-of-sale device. Communication module 902 is configured to send the parameters for the financial transaction to an authentication service which determines whether accounts associated with one or more financial instruments can be used to fulfill the financial transaction at a transaction location.

In some embodiments, clearinghouse 900 can include: a credit card processor; an automated clearinghouse; and other financial transaction processors now known or later developed.

In some embodiments, if the authentication service determines that the accounts can be used to fulfill the financial transaction at the transaction location, receiving module 901 is configured to receive a notification that the accounts can be used to fulfill the financial transaction at the transaction location. In some embodiments, communication module 902 is configured to send the notification to the point-of-sale device.

In some embodiments, the parameters for the financial transaction include one or more of: a merchant identifier; a transaction amount; the transaction location; account numbers for the accounts associated with the one or more financial instruments; expiration dates for the accounts; names of one or more users associated with the accounts; and identifiers for financial institution that issued the accounts.

In some embodiments, one or more of receiving module 901, and communication module 902 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.

Location-Based Authentication Service

Figure 10:
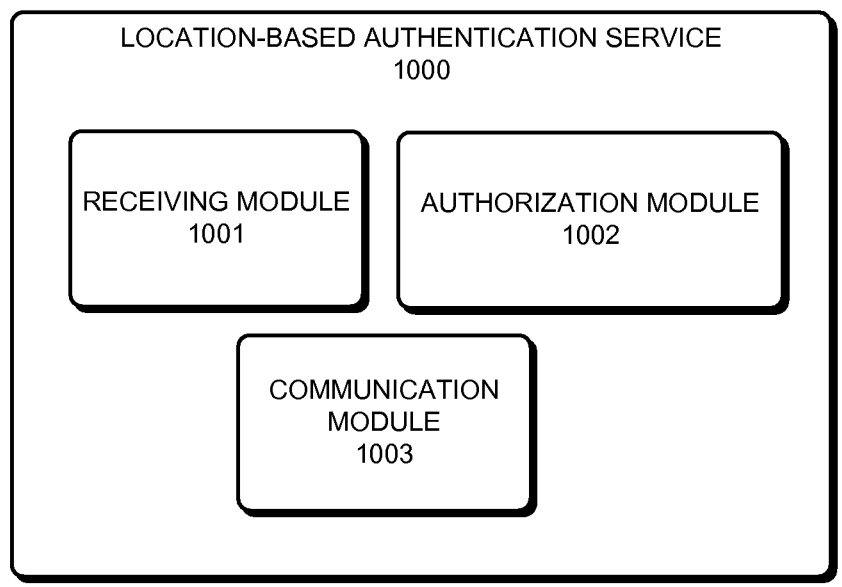
FIG. 10 presents a block diagram of a location-based authentication service in accordance with an embodiment of the present invention.

FIG. 10 presents a block diagram of location-based authentication service 1000 in accordance with an embodiment of the present invention. Location-based authentication service 1000 includes one or more of: receiving module 1001; authorization module 1002; and communication module 1003. Receiving module 1001 is configured to receive a request to authorize accounts associated with one or more financial instruments to be used to fulfill a financial transaction at a transaction location. In some embodiments, the request is received from one or more of: a clearinghouse; and a point-of-sale device. Authorization module 1002 is configured to determine whether the accounts are authorized to be used to fulfill the financial transaction at the transaction location. If authorization module 1002 determines that the accounts are authorized to be used to fulfill the financial transaction at the transaction location, authorization module 1002 is configured to authorize the accounts to be used to fulfill the financial transaction. Otherwise, authorization module 1002 is configured to not authorize the accounts to be used to fulfill the financial transaction.

In some embodiments, receiving module 1001 is configured to receive a present location of a user associated with the accounts being used to fulfill the financial transaction. While determining whether the accounts are authorized to be used at the transaction location, authorization module 1002 is configured to determine whether the present location of the user is within a specified distance of the transaction location. If authorization module 1002 determines that the present location is within the specified distance of the transaction location, authorization module 1002 is configured to determine that the accounts are authorized to be used at the transaction location. If authorization module 1002 determines that the present location is not within the specified distance of the transaction location, authorization module 1002 is configured to determine that the accounts are not authorized to be used at the transaction location.

In some embodiments, if authorization module 1002 determines that the accounts are authorized to be used to fulfill the financial transaction at the transaction location, communication module 1003 is configured to send a notification that the accounts are authorized to be used to fulfill the financial transaction at the transaction location. In some embodiments, the notification is sent to one or more of: a clearinghouse; and a point-of-sale device.

In some embodiments, the request includes one or more of: the transaction location at which the financial transaction is being performed; parameters for the accounts; a transaction amount; and a merchant identifier.

Figure 11:
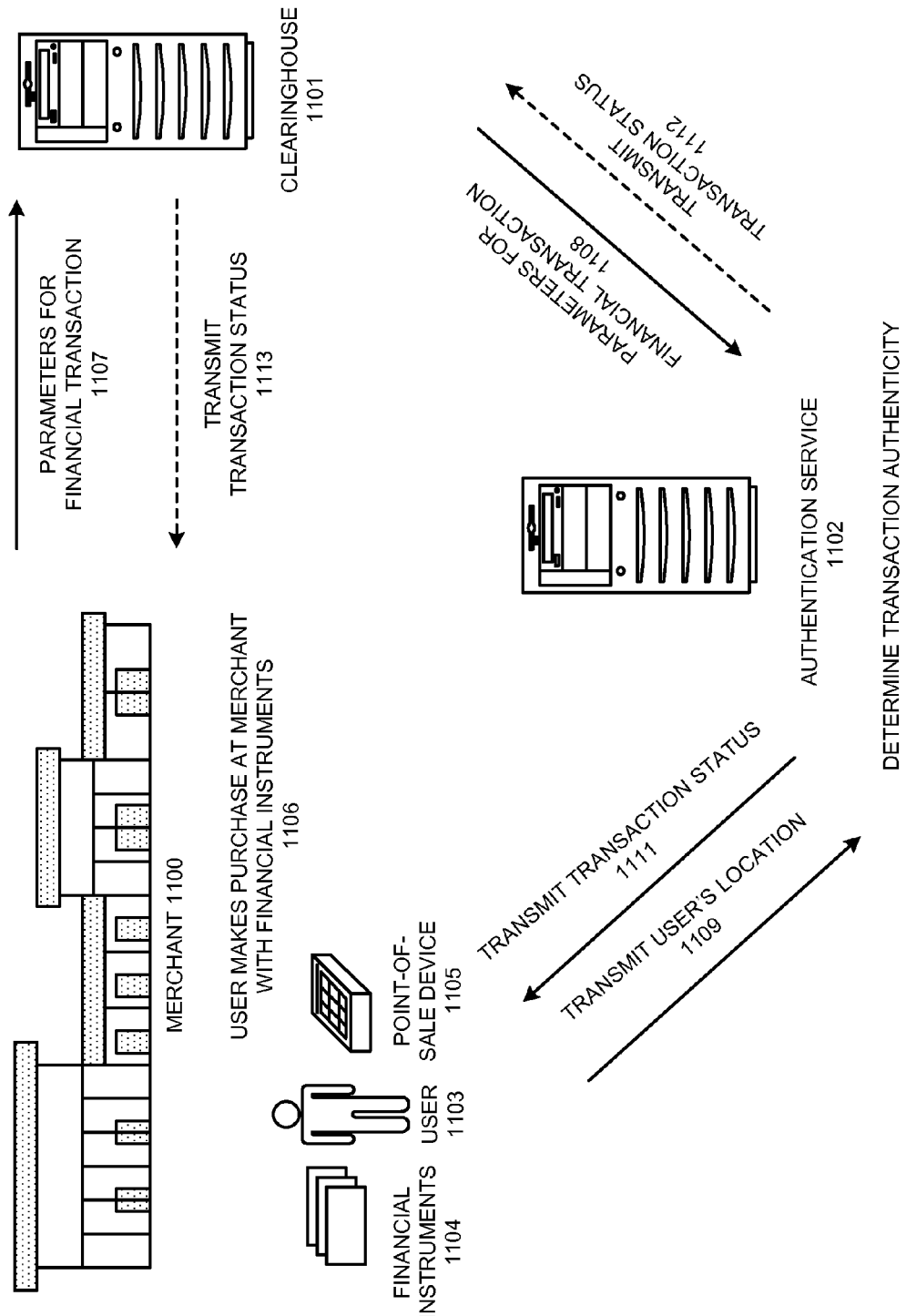
FIG. 11 presents an exemplary process for authorizing a financial transaction in accordance with an embodiment of the present invention.

In some embodiments, one or more of receiving module 1001, authorization module 1002, and communication module 1003 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.
Exemplary Implementations FIG. 11 presents an exemplary process for authorizing a financial transaction in accordance with an embodiment of the present invention. In this example, user 1103 uses one or more financial instruments 1104 to make a purchase at merchant 1100 (step 1106). In some embodiments, user 1103 uses point-of-sale device 1105 to make the purchase.

In some embodiments, point-of-sale device 1105 sends parameters for the financial transaction to clearinghouse 1101 (step 1107). For example, these parameters can include, but are not limited to, a transaction amount, parameters for the one or more financial instruments 1104, a merchant identifier, and a location of point-of-sale device 1105. Clearinghouse 1101 then sends the parameters for the financial transaction to authentication service 1102 (step 1108). In some embodiments, authentication service 1102 is a location-based authentication service.

In some embodiments, user 1103 transmits the user's location to authentication service 1102 (step 1109). For example, the user's location can be transmitted by a global-positioning system (GPS) enabled mobile phone, GPS-enabled personal digital assistant (PDA), a financial instrument which includes a GPS system, and any other mobile device that can be configured to use a GPS system to determine the location of user 1103. In some embodiments, the user's location is transmitted in response to a request by authentication service 1102. In some embodiments, the user initiates the transmission of the user's location to authentication service 1102. In some embodiments, the user's location is periodically transmitted to authentication service 11102.

Next, authentication service 1102 determines the transaction authenticity (step 1110). If the location of user 1103 is within a specified distance of point-of-sale device 1105, authentication service 1102 approves the purchase. Otherwise, authentication service 1102 determines that the purchase may be fraudulent and does not approve the purchase.

In some embodiments, if authentication service 1102 approves the purchase, authentication service 1102 transmits the transaction status back to point-of-sale device 1105 (step 1111). In some embodiments, authentication service 1102 transmits the transaction status back to point-of-sale device 1105 through clearinghouse 1101 (steps 1112-1113).

Note that there is a possibility that a false negative may occur (e.g., there is no GPS signal available at the transaction location). In these situations, embodiments of the present invention allow the user to contact the clearinghouse and/or the issuer of the financial instrument to provide verification of the user's identity so that the transaction can proceed.

Figure 12:
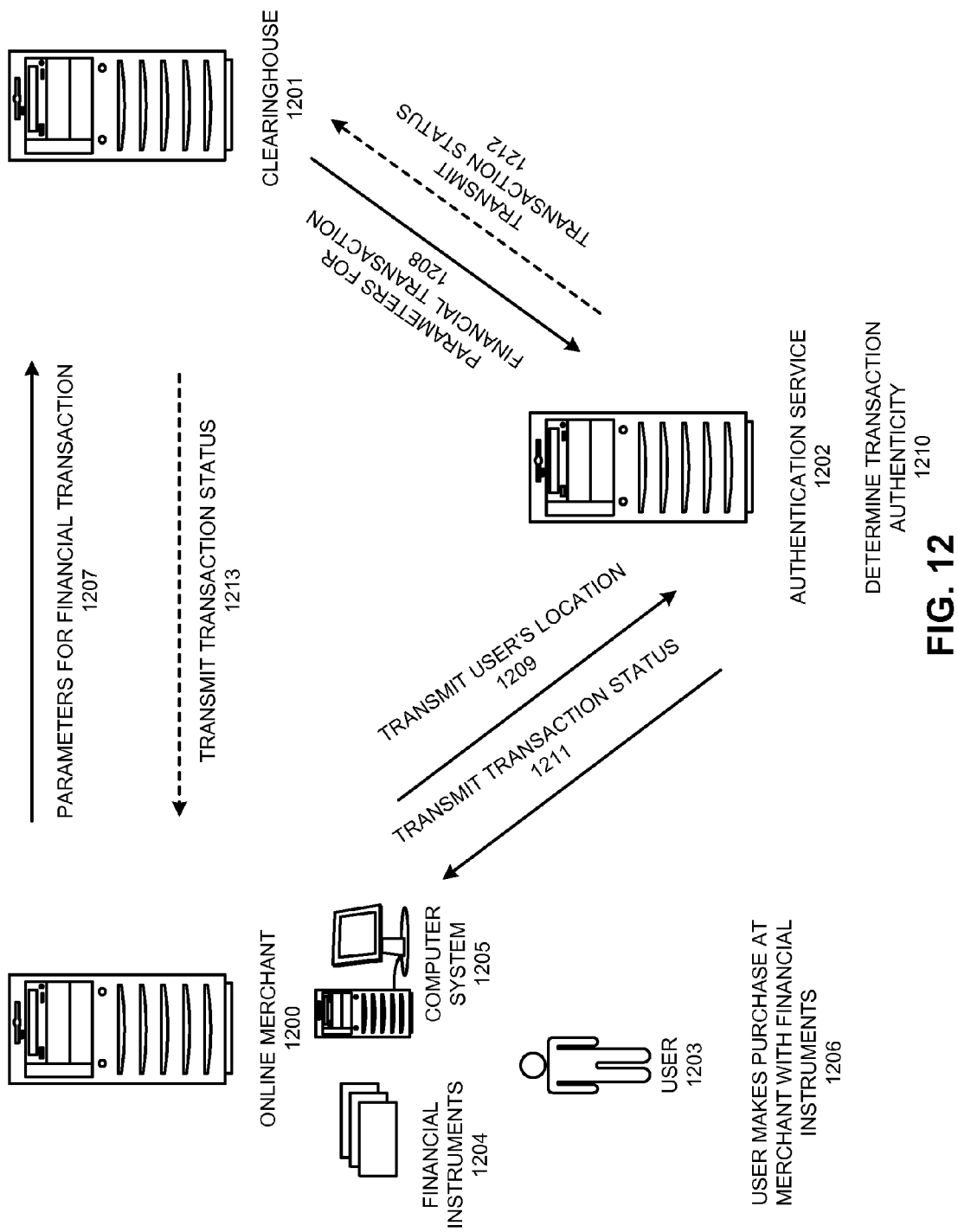
FIG. 12 presents another exemplary process for authorizing a financial transaction in accordance with an embodiment of the present invention.

FIG. 12 presents another exemplary process for authorizing a financial transaction in accordance with an embodiment of the present invention. In this example, user 1203 uses one or more financial instruments 1204 to make a purchase at online merchant 1200 (step 1206). In some embodiments, user 1203 uses computer system 1205 to access an online storefront operated by online merchant 1200. In doing so, user 1203 uses computer system 1205 to transmit parameters for financial instruments 1204 to online merchant 1200 to make a purchase with online merchant 1200.

In some embodiments, online merchant 1200 sends parameters for the financial transaction to clearinghouse 1201 (step 1207). For example, these parameters can include, but are not limited to, a transaction amount, parameters for the one or more financial instruments 1204, a merchant identifier, and an Internet Protocol (IP) address associated with computer system 1205. Clearinghouse 1201 then sends the parameters for the financial transaction to authentication service 1202 (step 1208). In some embodiments, authentication service 1202 is a location-based authentication service.

In some embodiments, user 1203 transmits the user's location to authentication service 1202 (step 1209). For example, the user's location can be transmitted by a GPS-enabled mobile phone, GPS-enabled personal digital assistant, a financial instrument which includes a GPS system, and any other mobile device that can be configured to use a GPS system to determine the location of user 1203. In some embodiments, the user's location is transmitted in response to a request by authentication service 1202. In some embodiments, the user initiates the transmission of the user's location to authentication service 1202. In some embodiments, the user's location is periodically transmitted to authentication service 1202.

Next, authentication service 1202 determines the transaction authenticity (step 1210). If the IP address associated with computer system 1205 is within a specified distance of user 1203, authentication service 1202 approves the purchase. Otherwise, authentication service 1202 determines that the purchase may be fraudulent and does not approve the purchase. In some embodiments, if the IP address associated with computer system 1205 is outside of a specified geographic area (e.g., outside of a country in which user 1203 resides), authentication service 1202 determines that the purchase may be fraudulent and does not approve the purchase.

In some embodiments, if authentication service 1202 approves the purchase, authentication service 1202 transmits the transaction status back to online merchant 1200 (step 1211). In some embodiments, authentication service 1202 transmits the transaction status back to online merchant 1200 through clearinghouse 1201 (steps 1212-1213).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for authorizing a financial transaction, comprising:
   receiving, by computer, from a Point-of-Sale (POS) system, a request to authorize a financial transaction on a financial account associated with two or more users;
   determining that the financial account is restricted to being used when the two or more users are within a specified distance of each other and within a specified distance of a transaction location at which the financial transaction is being performed;
   determining the transaction location;
   determining present locations of the two or more users;
   determining if the present locations of the two or more users are within the specified distance of each other and within the specified distance of the transaction location;
   if so, processing the financial transaction;
   if not, declining the financial transaction; and
   sending a status of the financial transaction to the POS system.

2. A non-transitory computer-readable storage medium storing instructions that when executed by a computer cause the computer to perform a method for authorizing a financial transaction, wherein the method comprises:
   receiving, by computer, from a Point-of-Sale (POS) system, a request to authorize a financial transaction on a financial account associated with two or more users;
   determining that the financial account is restricted to being used when the two or more users are within a specified distance of each other and within a specified distance of a transaction location at which the financial transaction is being performed;
   determining the transaction location;
   determining present locations of the two or more users;
   determining if the present locations of the two or more users are within the specified distance of each other and within the specified distance of the transaction location;
   if so, processing the financial transaction;
   if not, declining the financial transaction; and
   sending a status of the financial transaction to the POS system.

3. An apparatus configured for authorizing a financial transaction, comprising:
   a processor; and
   a non-transitory computer-readable storage medium storing instructions that, when executed by the processor, cause the apparatus to perform the methods of:
      receiving from a Point-of-Sale (POS) system, a request to authorize a financial transaction on a financial account associated with two or more users;
      determining that the financial account is restricted to being used when the two or more users are within a specified distance of each other and within a specified distance of a transaction location at which the financial transaction is being performed;
      determining the transaction location;
      determining present locations of the two or more users;
      determining if the present locations of the two or more users are within the specified distance of each other and within the specified distance of the transaction location;
      if so, processing the financial transaction;
      if not, declining the financial transaction; and
      sending a status of the financial transaction to the POS system.

* * * * *